United States Patent
Elmdahl et al.

(10) Patent No.: US 9,894,543 B2
(45) Date of Patent: *Feb. 13, 2018

(54) EVALUATION OF RADIO NETWORK FEATURE

(71) Applicant: Telefonaktiebolaget L M Ericsson (publ), Stockholm (SE)

(72) Inventors: Per Elmdahl, Linköping (SE); Samuel Axelsson, Linköping (SE); Rasmus Axén, Linköping (SE); Fredrik Gunnarsson, Linköping (SE); Ulf Hubinette, Linköping (SE); Christian Skärby, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 660 days.

This patent is subject to a terminal disclaimer.

(21) Appl. No.: 14/115,644

(22) PCT Filed: Sep. 27, 2013

(86) PCT No.: PCT/SE2013/051126
§ 371 (c)(1),
(2) Date: Nov. 5, 2013

(87) PCT Pub. No.: WO2014/051512
PCT Pub. Date: Apr. 3, 2014

(65) Prior Publication Data
US 2015/0156649 A1    Jun. 4, 2015

Related U.S. Application Data

(60) Provisional application No. 61/707,469, filed on Sep. 28, 2012.

(51) Int. Cl.
*H04W 24/08* (2009.01)
*H04L 12/26* (2006.01)
(Continued)

(52) U.S. Cl.
CPC .......... *H04W 24/08* (2013.01); *H04B 7/0413* (2013.01); *H04L 43/04* (2013.01);
(Continued)

(58) Field of Classification Search
CPC .................................................... H04W 24/08
(Continued)

(56) References Cited

U.S. PATENT DOCUMENTS 8,989,140 B2    3/2015   Ge et al.
2006/0265353 A1*  11/2006  Garg et al. ........... 707/2
(Continued)

FOREIGN PATENT DOCUMENTS

EP    1768291 A1    3/2007
EP    2239974 A2    10/2010
(Continued)

OTHER PUBLICATIONS

Huawei Consideration on CP solution of minimization of drive test, published on Sep. 11, 2011.*
(Continued)

*Primary Examiner* — Ian N Moore
*Assistant Examiner* — Mewale Ambaye
(74) *Attorney, Agent, or Firm* — Murphy, Bilak & Homiller, PLLC

(57) ABSTRACT

A method and network node (400) for supporting evaluation of usage of a radio network feature in radio communication between wireless devices (402) and the network node. The network node (400) retrieves (4:1) statistical information regarding the usage of the radio network feature, and reports (4:5) the statistical information to an Operation and Maintenance, O&M, node (404). The O&M node then uses (4:6) the statistical information for evaluating how measured
(Continued)

performance (4:3) of the radio network is related to the usage of the radio network feature.

23 Claims, 4 Drawing Sheets

(51) Int. Cl.
| | | |
|---|---|---|
| *H04W 24/10* | (2009.01) | |
| *H04W 72/04* | (2009.01) | |
| *H04W 24/02* | (2009.01) | |
| *H04B 7/0413* | (2017.01) | |

(52) U.S. Cl.
CPC ........... *H04W 24/02* (2013.01); *H04W 24/10* (2013.01); *H04W 72/0406* (2013.01)

(58) Field of Classification Search
USPC ......................................................... 370/241
See application file for complete search history.

(56) References Cited

U.S. PATENT DOCUMENTS

| | | | |
|---|---|---|---|
| 2009/0310501 A1* | 12/2009 | Catovic et al. ............... | 370/252 |
| 2010/0246506 A1 | 9/2010 | Krishnaswamy et al. | |
| 2011/0026449 A1 | 2/2011 | Kuo et al. | |
| 2011/0274043 A1 | 11/2011 | Nam et al. | |
| 2012/0003943 A1 | 1/2012 | Marinier et al. | |
| 2012/0163338 A1 | 6/2012 | Zhang et al. | |
| 2013/0040683 A1 | 2/2013 | Siomina et al. | |
| 2013/0230004 A1 | 9/2013 | Nam et al. | |
| 2013/0322395 A1* | 12/2013 | Kazmi ............... | H04W 72/082 370/329 |
| 2014/0128057 A1 | 5/2014 | Siomina et al. | |
| 2014/0233457 A1 | 8/2014 | Koutsimanis et al. | |

FOREIGN PATENT DOCUMENTS

| | | | |
|---|---|---|---|
| JP | 2002247048 A | | 8/2002 |
| JP | 2008283283 A | | 11/2008 |
| WO | 2012095113 A1 | | 7/2012 |
| WO | 2012116489 A1 | | 9/2012 |
| WO | WO 2012/095113 | * | 7/2015 |

OTHER PUBLICATIONS

Nokia Siemens (hereinafter referred as Nokia) "Architectures comparison", 3GPP DRAFT; published on Sep. 11, 2009, pp. 8.*

3GPP (hereinafter referred as 3GPP) "Management for carrier aggregation for LTE", published Aug. 22, 2011, pp. 4.*

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)." 3GPP TS 36.300 V10.8.0. Jun. 2012. 1-194.

3GPP, "3rd Generation Partnership Project; Technical Specification Group Radio Access Network; Evolved Universal Terrestrial Radio Access (E-UTRA); Layer 2—Measurements (Release 10)." 3GPP TS 36.314 V10.2.0. Sep. 2011. 1-17.

3GPP, "3rd Generation Partnership Project; Technical Specification Group Radio Access Network; Evolved Universal Terrestrial Radio Access (E-UTRA); Medium Access Control (MAC) protocol specification (Release 10)." 3GPP TS 36.321 V10.6.0. Sep. 2012. 1-54.

3GPP, "3rd Generation Partnership Project; Technical Specification Group Radio Access Network; Evolved Universal Terrestrial Radio Access (E-UTRA); Physical layer procedures (Release 10)." 3GPP TS 36.213 V10.7.0. Sep. 2012. 1-126.

3GPP, "3rd Generation Partnership Project; Technical Specification Group Radio Access Network; Evolved Universal Terrestrial Radio Access (E-UTRA); Radio Resource Control (RRC); Protocol specification (Release 10)." 3GPP TS 36.331 V10.7.0. Sep. 2012. 1-304.

3GPP, "3rd Generation Partnership Project; Technical Specification Group Services and System Aspects; Telecommunication management; Performance Management (PM); Performance measurements Evolved Universal Terrestrial Radio Access Network (E-UTRAN) (Release 10)." 3GPP TS 32.425 V10.7.0. Jun. 2012. 1-66.

Unknown, Author. "Consideration on CP Solution of Minimization of Drive Test." Huawei. 3GPP TSG-RAN WG2 #68. R2-096600. Jeju, Korea. Nov. 9-13, 2009. 1-4.

Unknown, Author. "Architectures comparison." Nokia Siemens Networks, Nokia Corporation. 3GPP TSG-RAN WG2Meeting #68. R2-097020. Jeju, Korea. Nov. 9-13, 2009. 1-8.

Unknown, Author. "Management for Carrier Aggregation for LTE." 3GPP TSG SA Meeting #53. SP-110636. Fukoka, Japan. Sep. 19-21, 2011. 1-4.

Unknown, Author. "New WID for Enhanced NM Centralised Coverage and Capacity Optimisation." 3GPP TSG SA Meeting #56. TD SP-120347. Ljubljana, Slovenia. Jun. 18-20, 2012. 1-8.

3GPP, "3rd Generation Partnership Project; Technical Specification Group Services and System Aspects; Telecommunication management; Performance Management (PM); Performance measurements Evolved Universal Terrestrial Radio Access Network (E-UTRAN) (Release 11)", 3GPP TS 32.425 V11.2.0, Mar. 2012, 1-67.

* cited by examiner

EVALUATION OF RADIO NETWORK FEATURE

TECHNICAL FIELD

The present disclosure relates generally to a network node of a radio network and an Operation and Maintenance, O&M, node, and methods therein, for evaluation of usage of a radio network feature in radio communication between wireless devices, and the network node.

BACKGROUND

In recent years, different types of radio networks have been developed to provide radio communication for various wireless terminals in different areas. The radio networks are constantly improved to provide better capacity, quality and coverage to meet the demands from subscribers using services and increasingly advanced terminals, such as smartphones and tablets, which often require considerable amounts of bandwidth and resources for data transport in the networks. Therefore, it is often a challenge to achieve good performance, e.g. in terms of high data throughput, low latency and low rate of dropped or lost data, in the radio communication between network nodes in the radio network and various wireless devices communicating with the network nodes.

In order to improve the performance of such radio communication, various radio network features can be employed that are intended to make the radio communication more efficient. For example, in radio networks operating according to Long Term Evolution, LTE, features such as Carrier Aggregation, CA, and Multiple Input Multiple Output, MIMO, are commonly used as defined by the third Generation Partnership Project, 3GPP. In carrier aggregation multiple carriers are used simultaneously in radio communication with a wireless device, while in MIMO multiple data streams are conveyed using multiple antenna ports at the sender node and at the receiver node. Carrier aggregation and MIMO are employed mainly to increase data throughput.

In the field of radio communication, the term "wireless device" is commonly used and will be used in this disclosure to represent any terminal or device capable of radio communication including receiving downlink signals transmitted from a network node and sending uplink signals to the network node. Throughout this disclosure, wireless device could e.g. be exchanged for User Equipment, UE, which is another common term in this field.

Further, the term "network node", also commonly referred to as a base station, radio node, e-nodeB, eNB, etc., represents any node for radio access in a radio network that can communicate uplink and downlink radio signals with wireless devices. The radio network may also be referred to as a cellular network for radio communication. The network nodes described in this disclosure may, without limitation, include so-called macro nodes and low power nodes such as micro, pico, femto, Wifi and relay nodes, to mention some customary examples. Throughout this disclosure, network node could e.g. be exchanged for base station.

A radio network is typically supported and controlled by a network management system referred to as Operation and Maintenance, O&M, which may include various entities and nodes. A simplified example of a typical architecture for such a network management system is schematically illustrated in FIG. 1. In this figure, an O&M layer is indicated by a dashed box containing O&M nodes that observe how the radio network operates in radio communication with wireless devices, and also configure the radio network to operate with sufficiently high performance. The O&M layer may comprise a plurality of domain managers 100A, 100B . . . , each being connected to and communicating with a set of network nodes 104 of a particular domain.

In this example, only three network nodes, or base stations, 104 are shown connected to the domain manager 100A for simplicity, although a much greater number of network nodes may in practice be connected to each domain manager. The domain managers 100A, 100B . . . are in turn connected to a central network manager 102 which basically coordinates evaluation, operation and configuration of the radio network, which is well-known in this field. The network nodes 104 may perform performance measurements and report information about measurement results to its respective domain managers, which in turn determine how the network nodes should be configured, or re-configured, e.g. in order to improve the performance, based on the reported measurements.

In order to improve or maintain performance in a radio network, measurements of performance is obtained from the radio network on a more or less continuous basis, e.g. in order to detect and analyze any changes of performance occurring in the radio network. Such measurements may be obtained and provided from the base stations and/or other nodes in the network. As said above, it is of great importance that performance is maintained at a sufficiently high level which may be achieved by employing various radio network features such as CA and MIMO, whenever suitable and effective.

However, it is often difficult to know how efficient and helpful a particular radio network feature really is to the network performance, since many factors, apart from the feature itself, may impact the achieved performance at the same time. Therefore, it may not be possible to determine that a measured or otherwise detected performance improvement is the result of a newly introduced radio network feature or not, or how much impact the feature has had on the performance, and so forth. It is thus a problem to make a useful and reliable evaluation of the usage of a radio network feature in radio communication between wireless devices and a network node.

SUMMARY

It is an object of embodiments described herein to address at least some of the problems and issues outlined above. It is possible to achieve this object and others by using a network node and an O&M node, and methods therein, as defined in the attached independent claims.

According to one aspect, a method is provided in a network node of a radio network, for supporting evaluation of usage of a radio network feature in radio communication between wireless devices and the network node. In this method, the network node retrieves statistical information regarding the usage of the radio network feature. The network node also reports the statistical information to an O&M node serving the radio network. Thereby, the O&M node is enabled to use the statistical information for evaluating how a measured performance of the radio network is related to the usage of the radio network feature.

According to another aspect, a network node of a radio network is provided where the network node is arranged to support evaluation of usage of a radio network feature in radio communication between wireless devices and the network node. The network node comprises a processing unit that is configured to retrieve statistical information regarding the usage of the radio network feature. The network node also comprises a communication circuitry that is configured to report the statistical information to an O&M node serving the radio network, thereby enabling the O&M node to use the statistical information for evaluating how measured performance of the radio network is related to the usage of the radio network feature.

According to another aspect, a method is provided in an O&M node serving a radio network, for evaluating usage of a radio network feature in radio communication between wireless devices and a network node of the radio network. In this method, the O&M node obtains measurements of radio network performance, and also receives statistical information regarding the usage of the radio network feature from the network node. The performance measurements may be obtained from the above network node and possibly also from one or more other network nodes of the radio network. The O&M node further uses the statistical information for performing evaluation of how the radio network performance is related to the usage of the radio network feature. The O&M node is then able to employ the radio network feature based on said evaluation, e.g. in the above network node and possibly also in one or more other network nodes of the radio network.

According to yet another aspect, an O&M node is serving a radio network, and the O&M node is arranged for evaluating usage of a radio network feature in radio communication between wireless devices and a network node of the radio network. The O&M node comprises an obtaining unit that is configured to obtain measurements of radio network performance, e.g. as described above.

The O&M node also comprises a communication circuitry that is configured to receive statistical information regarding the usage of the radio network feature from the network node, and a logic unit that is configured to use the statistical information for performing evaluation of how the radio network performance is related to the usage of the radio network feature. The O&M node further comprises an employing unit that is configured to employ the radio network feature based on said evaluation.

The above methods and nodes may be configured, arranged and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided in a network node and in an O&M node of a radio network, that can be used basically to achieve relevant and reliable evaluation of a radio network feature, and particularly to truthfully assess how usage of the radio network feature impacts the performance for wireless devices communicating with the network node. It is then possible to e.g. estimate how efficient the radio network feature in the network node is for improving the performance in the network, and this knowledge may in turn be utilized by the O&M node for deciding whether the radio network feature should be employed or not in the network node and/or in other network nodes. Performance in the radio network may be measured e.g. as the data throughput, latency or the rate of dropped or lost data, or any combination of the above.

A useful performance indicator in this context is data throughput in a network node, typically over a given time period, or time window, although other performance indicators may also be used. In practice, the data throughput is beneficially determined or measured at Internet Protocol, IP, level in the network node, since it is carrying the application layer data, that is data being useful for services. In an exemplifying radio access technology of E-UTRAN, the data throughput can be measured at the Packet Data Control Protocol, PDCP, layer, and the IP data throughput can be determined in a similar way in other radio access technologies.

The radio network feature discussed in this disclosure may be carrier aggregation in which two or more carriers are used simultaneously for radio communication with a wireless device, or MIMO in which two or more data streams are used in parallel for radio communication with a wireless device. A data stream in MIMO is also referred to as a "MIMO layer", and these two terms are interchangeable in this disclosure.

Figure 2:
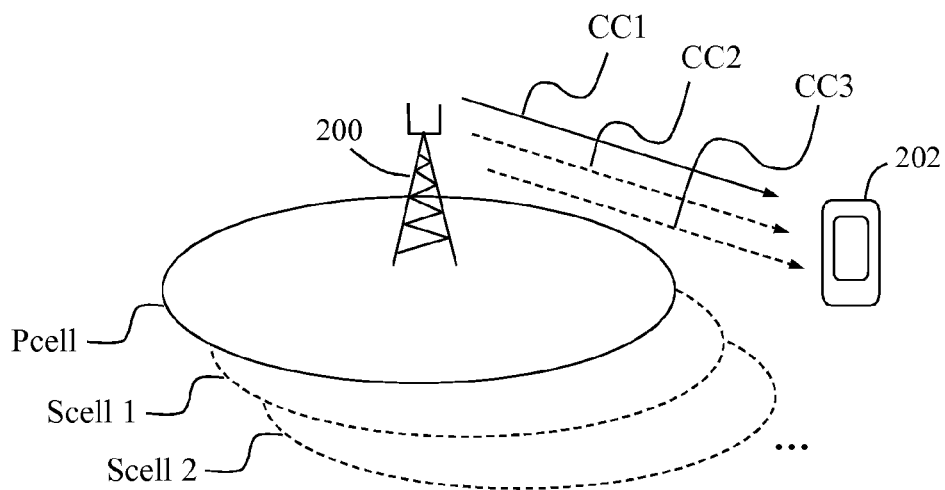
FIG. 2 is a schematic view of a network node using carrier aggregation in radio communication with a wireless device, where some embodiments described herein may be used.

In carrier aggregation, a network node such as a base station or the equivalent is able to communicate radio signals with a wireless device simultaneously over two or more different carriers, sometimes referred to as Component Carriers, CC, corresponding to multiple cells serving the wireless device, which is illustrated by an example in FIG. 2. In this example, a network node 200 sends downlink signals to a wireless device 202 over three different carriers CC1, CC2 and CC3 which in turn provide coverage in three corresponding cells. It should be noted that the configuration with three carriers and corresponding cells shown in FIG. 2 is just an illustrative example, and any number of carriers and cells may be employed for the carrier aggregation.

When serving the wireless device 202 with the carriers CC1, CC2 and CC3, one of the cells is appointed to act as a Primary cell, Pcell, in this example Pcell 1 which is served by a carrier CC1. The other two cells are appointed to act as Secondary cells, Scells, in this example Scell 2 and Scell 3 which are served by carriers CC2 and CC3, respectively. In this field of technology, a Pcell is defined as the "main" cell serving the wireless device such that both data and control signaling can be transmitted over the Pcell, while an Scell is defined as a supplementary cell that is typically used for transmitting data only, the Scell thus adding extra bandwidth to enable greater data throughput.

The above is applicable for both downlink and uplink signals. Further, the appointment of a Pcell and one or more Scells is made per device such that a particular carrier may be used in a Pcell for one wireless device and in an Scell for another wireless device. For example in FIG. 2, the carrier CC1 which is used for serving the device 202 in a Pcell could at the same time be used for serving another device in an Scell, not shown. Similarly, the carrier CC2, or CC3, which is used for serving the device 202 in an Scell could at the same time be used for serving another device in a Pcell, not shown.

Carrier aggregation may thus be used in radio communication with a wireless device to support wider transmission bandwidths. The wireless device must have reception and/or transmission capabilities for carrier aggregation such that it can simultaneously receive and/or transmit on multiple carriers, which is the case for devices configured according to the third Generation Partnership Project, 3GPP, Rel-10 or later. In this way, the network node is able to serve several cells with basically the same coverage area as shown in FIG. 2, or with different coverage areas, at different carrier frequencies.

Carrier aggregation can be used both for uplink communication and for downlink communication. Further, it is possible to configure a wireless device to aggregate a different number of carriers in the uplink than in the downlink, still originating from the same network node, thus enabling different bandwidths in uplink and downlink. The maximum number of downlink carriers that can be configured for a wireless device depends on the downlink aggregation capability of the device. Similarly, the maximum number of uplink carriers that can be configured depends on the uplink aggregation capability of the device.

In MIMO, multiple antenna ports are used both at a sending node and at a receiving node in order to convey multiple spatially separated data streams between the sending and receiving nodes. MIMO can likewise be used both for uplink communication and for downlink communication. In uplink communication, the wireless device is the sending node and the network node is the receiving node, while in downlink communication, the network node is the sending node and the wireless device is the receiving node. According to LTE Rel-8, a network node can have 1, 2, or 4 physical antenna ports, and different reference signals are sent out on these antenna ports. In later releases, it is also possible to configure more than four antenna ports.

A wireless device can indicate to its serving network node its capability to support multiple data streams in downlink and/or uplink communication. Moreover, the network node can schedule data on one or more data streams in downlink and/or uplink via physical control channels and/or MAC control elements which are signaled to the wireless device.

As mentioned above, a specific radio network feature, such as carrier aggregation using a specific number of carriers, or MIMO using a specific number of data streams or MIMO layers, may be employed in a network node which feature is intended to improve performance in the radio network, e.g. in terms of throughput. In order for the network node to be aware of which radio network features that are supported by a particular wireless device, the network node is able to request device capability information from the device including what features the device supports. The device then responds with indicators of its supported features, either one indicator per feature or via feature group indicators where several features are indicated together. Further, usage of a radio network feature may in this context refer to different "stages" or "levels" of usage. In this disclosure, the following definitions are used:

A wireless device is said to be capable of supporting a radio network feature if it has indicated the feature via device capability information over Radio Resource Control, RRC, or similar.

A wireless device is said to have a radio network feature configured if the feature is configured via signaling from the serving network node. The feature may be signaled via RRC or similar. Alternative signaling is to have it always configured.

A wireless device is said to have a radio network feature activated if it is activated via signaling from the serving network node. Typically, activation is on a lower protocol layer than the configuration, for example on the Medium Access Control, MAC, layer.

A wireless device is said to have a radio network feature scheduled if the radio network feature is in use as part of a data transmission.

In embodiments described herein, it has been realized that it is beneficial to evaluate usage of a radio network feature by evaluating how a measured performance of the radio network is related to the actual usage of the radio network feature, that is depending on what extent the radio network feature has been used in radio communication with a network node. This may be achieved by counting the number of wireless devices that are at some level using the radio network feature, which will be explained in more detail later below.

The extent of feature usage may be expressed or indicated in different ways. Firstly, the extent of feature usage may be indicated explicitly, e.g. as the amount of devices using the feature when served by the network node, or as a percentage of devices using the feature relative to the total amount of devices served by the network node, or as a ratio between the number of devices using the feature and the number of devices not using the feature, and so forth. Secondly, it is also possible to indicate the extent of feature usage implicitly, e.g. as the amount of devices not using the feature when served by the network node, or as a percentage of devices not using the feature relative to the total amount of devices served by the network node, or as a ratio between the number of devices not using the feature and the number of devices using the feature, and so forth. Any of the above alternatives can thus be used to indicate, explicitly or implicitly, the usage of the radio network feature.

Figure 1:
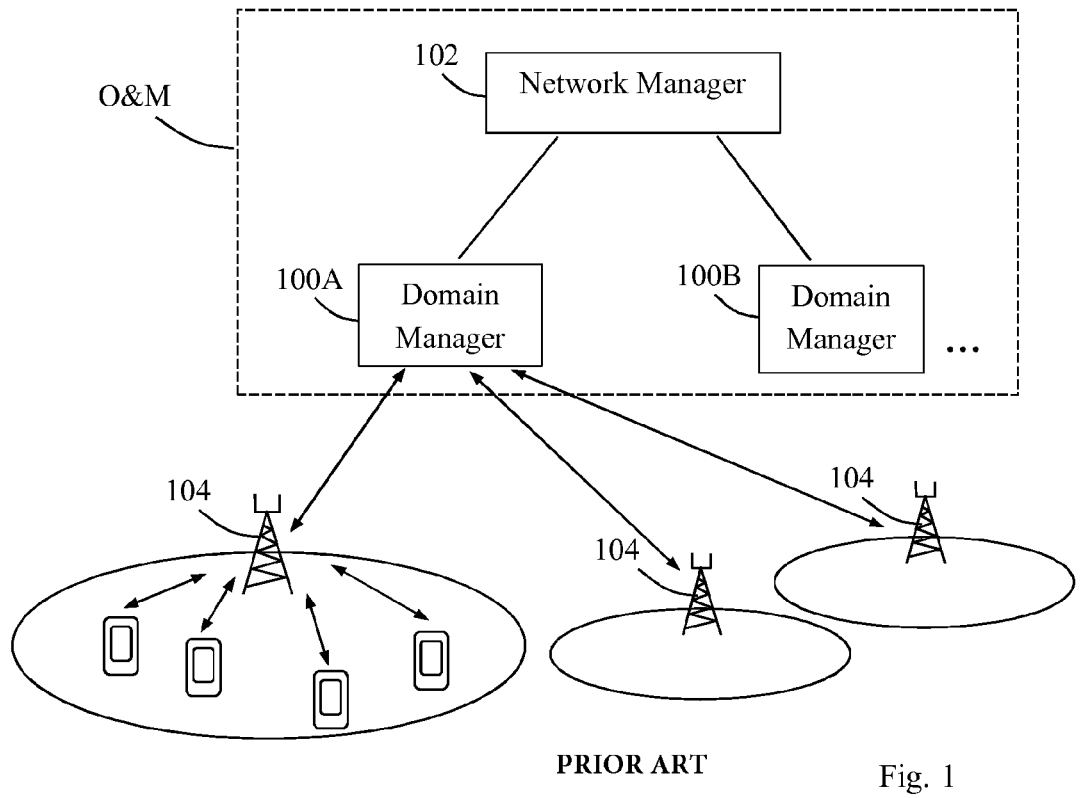
FIG. 1 is a communication scenario illustrating an architecture for network management, in which the embodiments described herein may be used.

It will now be described, with reference to the flow chart in FIG. 3, how a network node of a radio network may operate to support evaluation of usage of a radio network feature in radio communication between wireless devices and the network node, according to some possible embodiments. It is assumed that the network node is connected to and managed by an O&M node which may correspond to a similar arrangement as illustrated in FIG. 1. The network node may be a base station or other similar node capable of radio communication with wireless devices. The procedure in FIG. 3 may be implemented by means of various functional units or entities in the network node which will be outlined in more detail later below in some possible examples.

A first action 300 illustrates that the network node retrieves statistical information regarding usage of the radio network feature in the radio communication, wherein the statistical information basically indicates to what extent or "how much" the radio network feature is used for wireless devices in radio communication with the network node. In other words, the statistical information indicates the number or amount of wireless devices using the radio network feature.

As mentioned above, usage of a radio network feature may pertain to different levels or stages of being capable, configured, activated and scheduled, respectively, to use the radio network feature. In different possible embodiments, the retrieved statistical information may thus indicate one or more of the following alternatives or aspects:
- the number of wireless devices that are capable of using the radio network feature,
- the number of wireless devices that are configured to use the radio network feature,
- the number of wireless devices that are activated to use the radio network feature, and
- the number of wireless devices that are scheduled to use the radio network feature.

The above alternatives may thus be regarded as different aspects of device capability which may be related to the number of supported carriers, i.e. how many carriers the device is capable to support.

In this context and considering the definitions described above, it is logical that a wireless device that is configured to use the radio network feature also needs to be capable of using the radio network feature. It is also logical that a wireless device that is activated to use the radio network feature also needs to be configured to use the radio network feature, and a wireless device that is scheduled to use the radio network feature also needs to be activated to use the radio network feature.

For example if the radio network feature is carrier aggregation, CA, where one or more secondary cells, Scells, are employed, the following exemplary but non-limiting messages and information elements may be used for signaling between a wireless device and a serving network node, when the embodiments above are implemented in practice:
- A wireless device can indicate to the serving network node its capability to support one or more SCells in the downlink, as well as one or more SCells in the uplink, via RRC signaling.
- CA capable wireless devices can be configured with one or more SCell in uplink and/or downlink via RRC signaling from the serving network node, using the message RRCConnectionReconfiguration and the information element sCellToAddModList-r10 and/or sCellToReleaseList-r10.
- CA configured wireless devices can have one or more of its SCells activated via signaling from the serving network node, using an activation MAC control element.
- CA activated wireless devices can have data scheduled at one or more of its SCells via control signaling from the serving network node. This control signaling can be sent via the physical control channel and MAC control element, and can refer to a downlink SCell resource and/or an uplink SCell resource. Moreover, if cross-carrier scheduling is supported, the SCell resource assignment can be signaled from the serving network node to the wireless device via the PCell physical control channel and/or MAC control elements.

Returning to FIG. 3, the network node may optionally aggregate the statistical information, as shown by an optional action 302, which may be done in different ways. For example in some further possible embodiments, the network node may aggregate the statistical information by means of different wireless device counters comprising at least one of: a counter of all wireless devices, a counter of wireless devices that are capable of using the radio network feature, a counter of wireless devices that are configured to use the radio network feature, a counter of wireless devices that are activated to use the radio network feature, and a counter of wireless devices that are scheduled to use the radio network feature.

In yet another possible embodiment, the network node may aggregate the statistical information for uplink communication and downlink communication separately, i.e. to indicate the usage of the radio network feature on the uplink and on the downlink, respectively. Further, the network node may retrieve the statistical information from a scheduling entity associated with the network node, which scheduling entity may be implemented in the network node or in another node controlling the radio communication to and from the network node.

In further possible embodiments, the network node may aggregate the statistical information by determining at least one of: a mean value, a median value, a maximum value, a minimum value, one or more percentiles, and a standard deviation, of the number of wireless devices involved in usage of the radio network feature over a time period.

Figure 3:
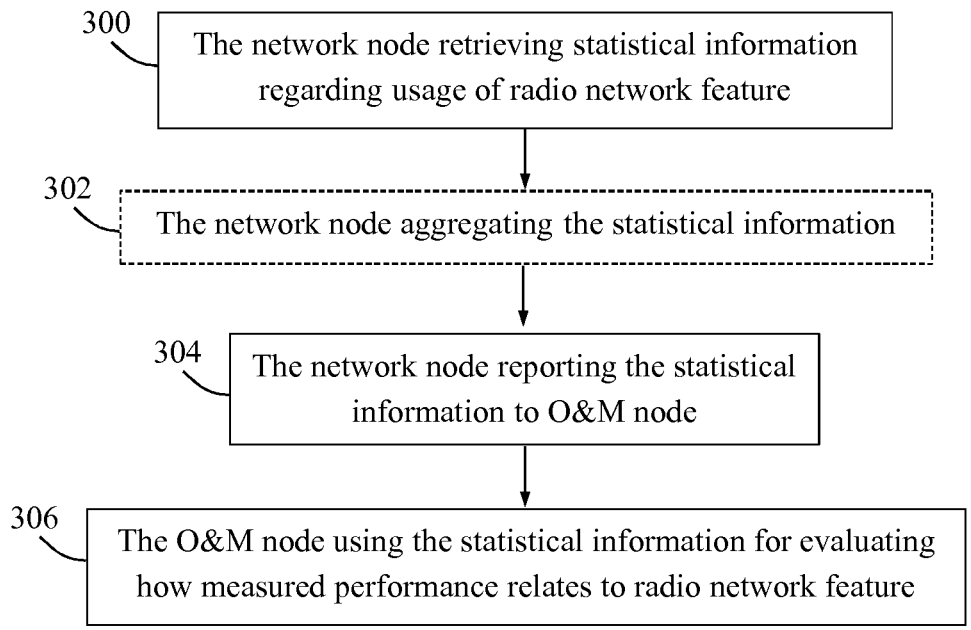
FIG. 3 is a flow chart illustrating a procedure in a network node, according to some possible embodiments.

In FIG. 3, a next action 304 illustrates that the network node reports the statistical information to the O&M node serving the radio network. Thereby, the O&M node is enabled to use the statistical information for evaluating how a measured performance of the radio network is related to the usage of the radio network feature, which is shown by another action 306. In particular, the O&M node is able to determine how efficient the usage of the radio network feature is and how it affects or impacts the measured performance.

It will be described in more detail later below how the O&M node may operate to evaluate the performance of the radio network in this context when receiving the statistical information from the network node. The performance of the radio network may be measured in different ways. It was mentioned above that data throughput, latency and drop rate are examples of measurable performance metrics that may be used in this context. Some more detailed and useful examples of measurements that can be obtained from network nodes include:
- Average downlink cell bit rate at the protocol layer of PDCP, where the PDCP bit rate may be an average for all wireless devices, possibly grouped by a quality of service class indicator and also over a certain time window.
- Average uplink cell PDCP bit rate.
- Average uplink and/or downlink PDCP delay.
- Average uplink and/or downlink PDCP drop rate.
- IP packet latency.
- IP packet throughput in downlink and/or uplink.

As mentioned above, the radio network feature may pertain to carrier aggregation comprising usage of two or more carriers. In that case, the network node may aggregate the statistical information by using a wireless device counter for each aspect of device capability related to number of supported carriers. The wireless devices may thus be categorized and counted according to their capabilities of using carrier aggregation, hence the aspects of device capability may be related to the number of supported carriers. In other words, one counter may count the number of devices that are capable of using only one carrier, another counter may count the number of devices that are capable of using two carriers, another counter may count the number of devices that are capable of using three carriers, and so forth. Some more detailed examples of how such devices may be counted will be described later below.

As also mentioned above, the radio network feature may pertain to MIMO comprising usage of two or more data streams, or MIMO layers. In that case, the network node may aggregate the statistical information by using a wireless device counter for each aspect of device capability related to number of supported data streams. The wireless devices may thus be categorized and counted according to their capabilities of using MIMO, hence the aspects of device capability related to number of supported data streams. In other words, one counter may count the number of devices that are capable of using only one data stream, another counter may count the number of devices that are capable of using two data streams, another counter may count the number of devices that are capable of using four data streams, and so forth.

In embodiments where statistics related to MIMO usage are reported, there can be statistics/counters for each supported MIMO aspect, which also can be different in uplink and downlink. One example of the supported MIMO aspect is the device capability to support different MIMO layers. It can be different in downlink and uplink, and it can be based on the different possible configurable number of layers or data streams. For example, in the uplink, the number of layers or data streams can be one, i.e. MIMO not used, two and four, and for the downlink one, two, four and eight.

Similarly, the wireless device may indicate in a channel state information report that it can benefit from different MIMO configurations. Also, the network node may disclose, based on measurements, how many layers the wireless device can support. This can be seen as different layers that can be configured for the wireless device in downlink and uplink. Also in this example, in the uplink, the number of layers can be one, two and four, and for the downlink one, two, four and eight.

Finally, the network node may schedule data in different layers for the wireless device in downlink and/or uplink, and there can be separate counters for counting how many wireless devices have been scheduled over more than one layer. Also in this example, in the uplink, the number of layers can be one, two and four, and for the downlink one, two, four and eight.

Figure 4:
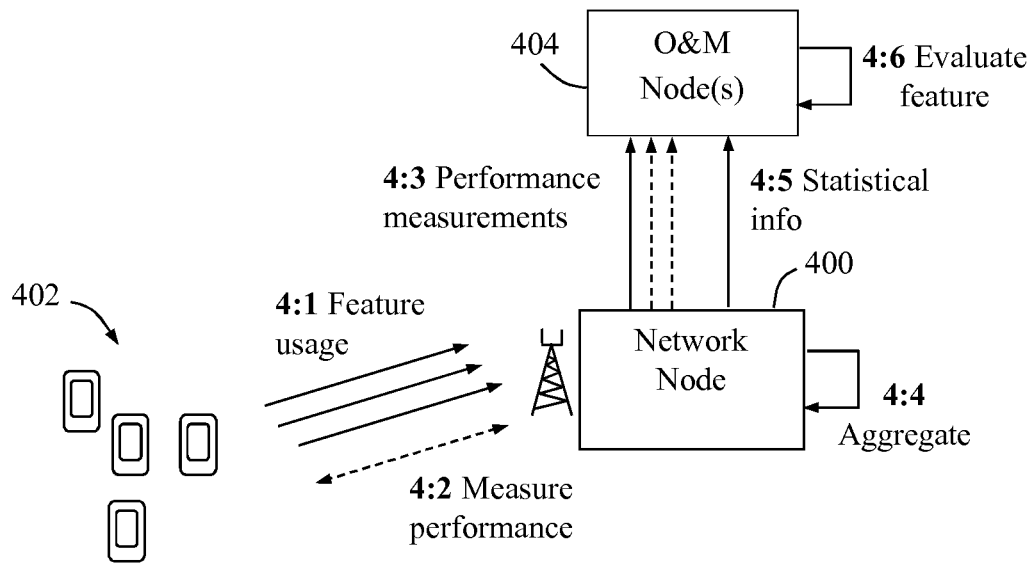
FIG. 4 is a communication scenario illustrating an example of actions and signal flows when the solution is employed, according to further possible embodiments.

The above procedure in FIG. 3 is also illustrated by an exemplifying scenario in FIG. 4 which shows different actions and signaling flows involving a network node 400 and an O&M node 404 of a radio network, which may be used when implementing the solution in practice. A first action 4:1 illustrates schematically that the network node 400 retrieves statistical information regarding the usage of the radio network feature, which may indicate the above-described different levels or stages of being capable, configured, activated and scheduled, respectively, to use the radio network feature. The feature usage may also be indicated explicitly or implicitly as described above. Examples of what such statistical information may indicate in more detail have also been described above. At the same time, more or less, the network node 400 also performs, or otherwise obtains, measurements of performance of the radio network, shown as another action 4:2. These performance measurements are reported from the network node 400 to the O&M node 404 in another action 4:3.

The network node 400 further aggregates the retrieved statistical information as shown by an action 4:4. Examples of how the statistical information may be aggregated have also been described above. An action 4:5 illustrates that the network node 400 reports the statistical information to the O&M node 404. It should be noted that actions 4:1, 4:4 and 4:5 of retrieving statistical information and reporting it to the O&M node 404 may be performed on a more or less continuous basis. Likewise, actions 4:2 and 4:3 of measuring performance of the radio network and reporting the measurements to the O&M node 404 may be performed on a more or less continuous basis as well, and also in parallel with actions 4:1, 4:4 and 4:5. The actions 4:1-4:5 may thus be performed in any suitable order and/or more or less continuously.

A final shown action 4:6 illustrates that the O&M node 404 uses the statistical information for performing evaluation of how a measured performance of the radio network is related to the usage of the radio network feature. For example, the O&M node 404 may decide whether to employ the radio network feature in the network node and/or in other network nodes, based on said evaluation.

Figure 5:
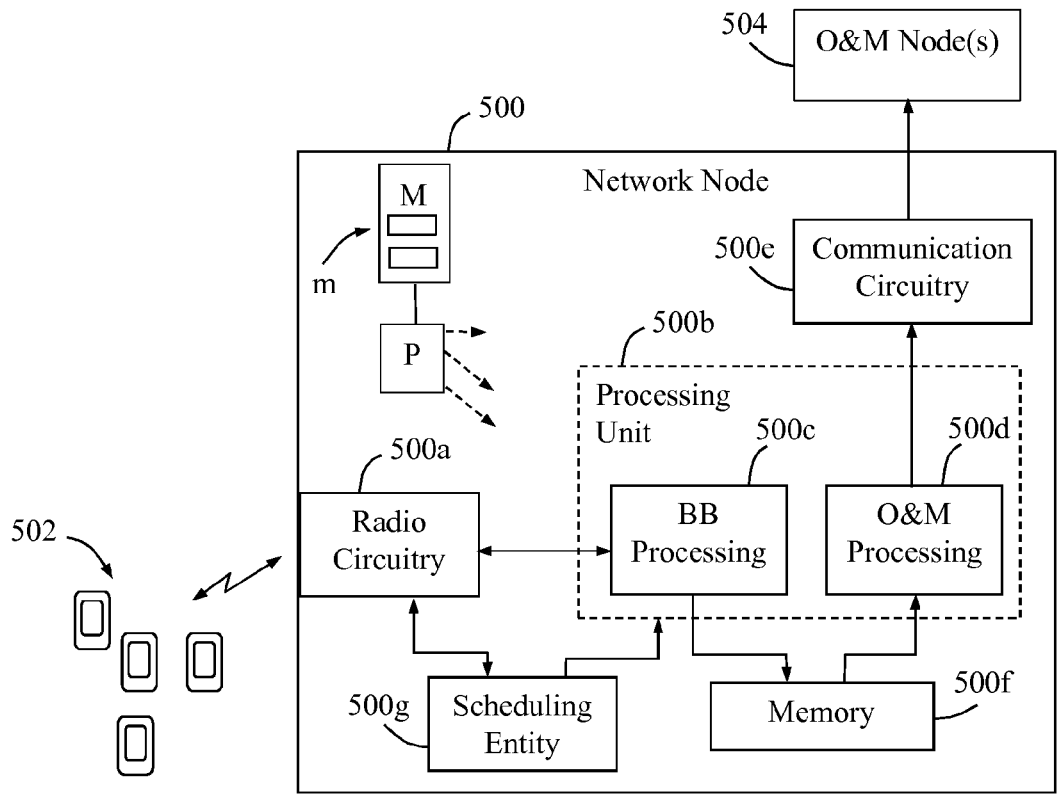
FIG. 5 is a block diagram illustrating a network node in more detail, according to further possible embodiments.

A detailed but non-limiting example of how a network node of a radio network may be structured with some possible functional units to bring about the above-described operation of the network node, is illustrated by the block diagram in FIG. 5. In this figure, the network node 500 is arranged for supporting evaluation of usage of a radio network feature in radio communication between wireless devices 502 and the network node. Again, it is assumed that the network node 500 is connected to an O&M node 504 serving the radio network. The network node 500 may be configured to operate according to any of the examples and embodiments of employing the solution as described above and as follows.

The network node 600 comprises a suitable radio circuitry 500a for conducting radio communication with the wireless devices 502 which may be done in a conventional manner. The network node 500 also comprises a processing unit 500b configured to retrieve statistical information regarding usage of the radio network feature, e.g. as described for action 300 above. The radio network feature may be carrier aggregation or MIMO and the processing unit 500b may be configured to aggregate the statistical information e.g. according to some of the embodiments described above.

In a practical implementation, the processing unit 500b may contain a unit for Base Band, BB, processing 500c for processing signals to and from the radio circuitry 500a, and a unit for O&M processing 500d that can be used for processing and preparing the statistical information before it is reported to the O&M node 504. The processing unit 500b may retrieve the statistical information from a scheduling entity 500g associated with the network node, and the statistical information may further be collected in a memory 500f connected to the BB processing unit 500c and to the O&M processing unit 500d.

The network node 500 also comprises a communication circuitry 500e configured to report the statistical information to the O&M node 504, thereby enabling the O&M node to use the statistical information for evaluating how a measured performance of the radio network is related to the usage of the radio network feature. A more detailed description of how the O&M node 504 may operate will be given below with reference to FIGS. 6 and 7.

The above network node 500 and its functional units may be configured or arranged to operate according to various optional embodiments. In a possible embodiment, the processing unit 500b may be configured to aggregate the statistical information by means of wireless device counters comprising at least one of: a counter of all wireless devices, a counter of wireless devices capable of using the radio network feature, a counter of wireless devices configured to use the radio network feature, a counter of wireless devices activated to use the radio network feature, and a counter of wireless devices scheduled to use the radio network feature. In another possible embodiment, the processing unit 500b may be configured to aggregate the statistical information for uplink communication and downlink communication separately.

In further possible embodiments, in case the radio network feature pertains to carrier aggregation comprising usage of two or more carriers, the processing unit 500b may be configured to aggregate the statistical information by using a wireless device counter for each aspect of device capability related to number of supported carriers. On the other hand, in case the radio network feature pertains to MIMO comprising usage of two or more data streams, the processing unit 500b may be configured to aggregate the statistical information by using a wireless device counter for each aspect of device capability related to number of supported data streams. Some possible examples of aspects of device capability have been described above.

It should be noted that FIG. 5 illustrates some possible functional units in the network node 500 and the skilled person is able to implement these functional units in practice using suitable software and hardware. Thus, the solution is generally not limited to the shown structures of the network node 500, and the functional units 500a-g may be configured to operate according to any of the features described in this disclosure, where appropriate.

The embodiments and features described herein may be implemented in a computer program comprising computer readable code which, when run on a network node, causes the network node to perform the above actions e.g. as described for FIGS. 3 to 5. Further, the above-described embodiments may be implemented in a computer program product comprising a computer readable medium on which a computer program is stored. The computer program product may be a compact disc or other carrier suitable for holding the computer program. The computer program comprises computer readable code which, when run on a first radio node, causes the network node 500 to perform the above actions. Some examples of how the computer program and computer program product can be realized in practice are outlined below.

The functional units 500a-g described above for FIG. 5 may be implemented in the network node 500 by means of program modules of a respective computer program comprising code means which, when run by a processor "P" causes the network node 500 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the network node 500 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the network node 500.

Figure 6:
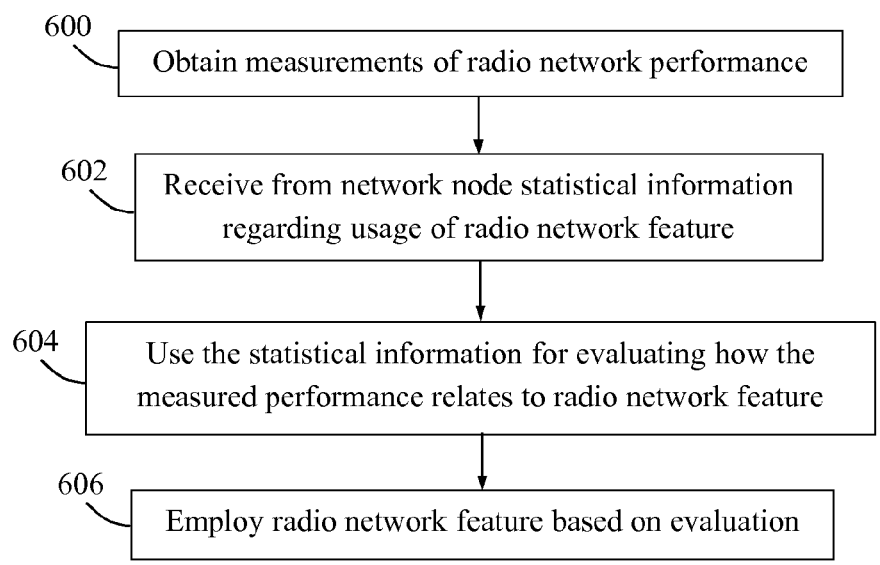
FIG. 6 is a diagram illustrating an example of how many wireless devices are capable of using carrier aggregation.

It will now be described, with reference to the flow chart in FIG. 6, how an O&M node may operate when the solution is used in a network node according to one or more of the above-described embodiments. In this example, the O&M node is serving a radio network and FIG. 6 illustrates a procedure performed by the O&M node for evaluating usage of a radio network feature in radio communication between wireless devices and a network node of the radio network. It is assumed that the network node employs the radio network feature in radio communication with at least some of the wireless devices.

A first action 600 illustrates that the O&M node obtains measurements of performance of the radio network, e.g. from the network node and/or other parts of the radio network. Some examples of how the performance of the radio network may be measured have been given above. The O&M node then receives statistical information reported from the network node regarding the usage of the radio network feature, in a further action 602, which basically corresponds to the above action 302 performed by the network node in FIG. 3.

In another action 604, the O&M node uses the statistical information for performing evaluation of how the radio network performance is related to the usage of the radio network feature, basically corresponding to action 306. In particular, the O&M node is able to get knowledge about whether the radio network feature has been successful for improving the network performance or not since this usage can be correlated to the measured performance of the radio network by means of the reported statistical information.

An action 606 finally illustrates that the O&M node employs the radio network feature, for the network node and/or for other network nodes, based on the evaluation made in action 604. For example, if the evaluation indicates that the radio network feature has been successful for improving the network performance, the O&M node may decide to employ the radio network feature for a forthcoming radio communication at the network node since the radio network feature has proved to be successful for that network node. On the other hand, if the evaluation indicates that the radio network feature was unsuccessful for improving the network performance, the O&M node may decide to not employ the radio network feature.

Figure 7:
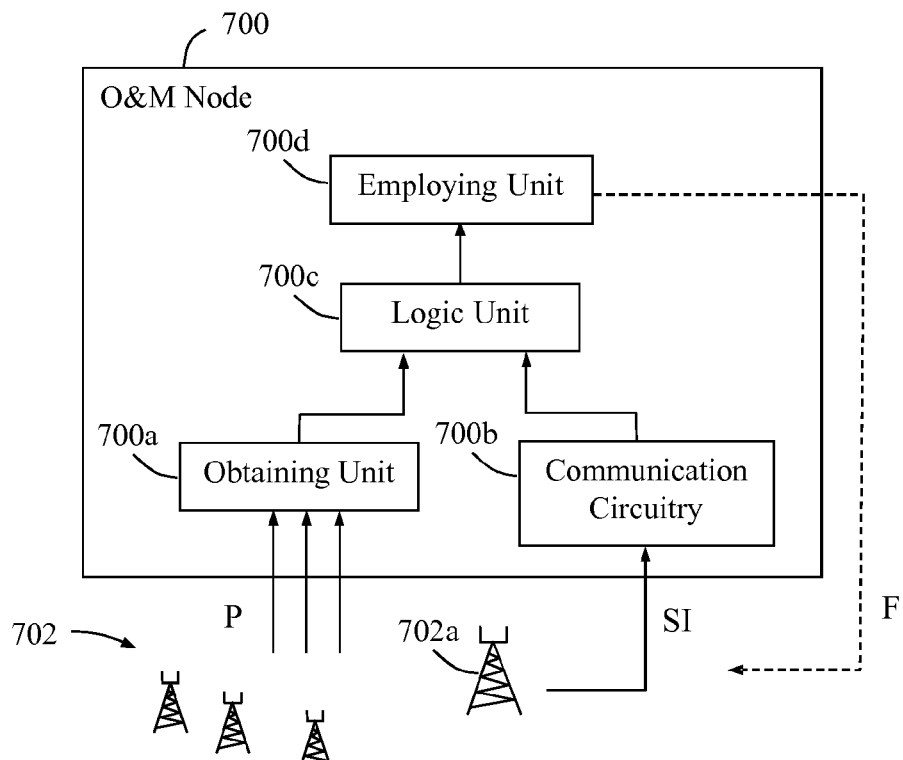
FIG. 7 is a diagram illustrating an example of how many wireless devices are capable of using MIMO.

A detailed but non-limiting example of how an O&M node may be structured with some possible functional units to bring about the above-described operation of the O&M node, is illustrated by the block diagram in FIG. 7. In this figure, the O&M node 700 is serving a radio network 702 and is arranged for evaluating usage of a radio network feature in radio communication between wireless devices and a network node 702a of the radio network. It is assumed that the network node 702a retrieves statistical information regarding usage of the radio network feature, e.g. as described above for FIGS. 3 to 5. The O&M node 700 may be arranged to operate according to any of the examples and embodiments of employing the solution as described above, whenever appropriate, and as follows.

The O&M node 700 comprises an obtaining unit 700a arranged to obtain a measured performance "P" of the radio network 702, and a communication circuitry 700b arranged to receive statistical information "SI" from the network node regarding usage of the radio network feature in the radio communication.

The O&M node 700 also comprises a logic unit 700c arranged to use the statistical information SI for performing evaluation of how the radio network performance is related to the usage of the radio network feature. Finally, the O&M node 700 further comprises an employing unit 700d arranged to employ the radio network feature "F", e.g. for the network node 702a and/or for other network nodes in the radio network, based on the performed evaluation. Although the O&M node 700 has been described in terms of cooperating with a specific network node 702a, the above-described features may be applied for any number of network nodes in the radio network and the solution is not limited in this respect.

Figure 8:
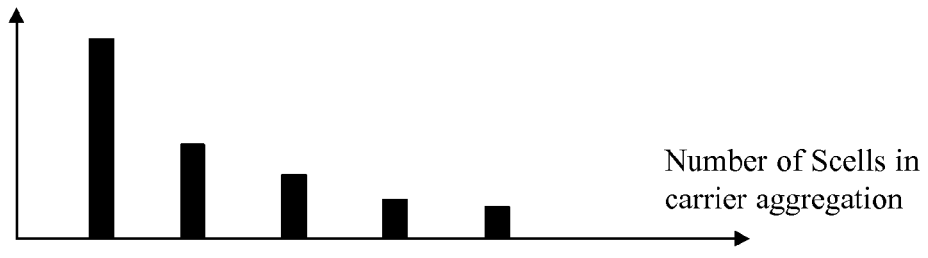
FIG. 8 is a flow chart illustrating a procedure in an O&M node, according to further possible embodiments.

FIG. 8 illustrates a typical distribution of how many wireless devices in a cell support different numbers of Scells when the radio network feature of carrier aggregation is employed. It can be seen that just a few devices support carrier aggregation with 5 Scells and that an increasing amount of devices support carrier aggregation with a maximum of 4, 3, 2 and 1 Scells, respectively. Naturally, a device that supports n Scells also supports n–1 Scells, n–2 Scells, and so forth. The wireless devices supporting 5, 4, 3, 2 and 1 Scells, respectively, can be classified into corresponding categories and a counter may be arranged to count the number of devices in each category.

Figure 9:
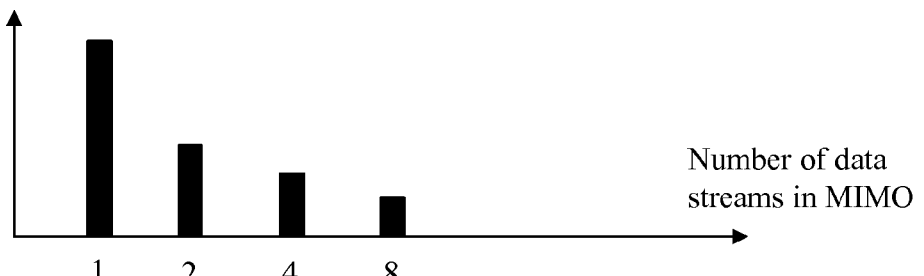
FIG. 9 is a block diagram illustrating an O&M node in more detail, according to further possible embodiments.

Similarly, FIG. 9 illustrates a typical distribution of how many wireless devices in a cell support different numbers of data streams when the radio network feature of MIMO is employed. It can be seen that just a few devices support MIMO with 8 data streams and that an increasing amount of devices support MIMO with 4 and 2 data streams and only 1 data stream, respectively, the latter thus not using MIMO. Naturally, a device that supports 8 data streams also supports 4 data streams, 2 data streams, and so forth. The wireless devices supporting 8, 4, 2 and 1 data streams, respectively, can be classified into corresponding categories and a counter may be arranged to count the number of devices in each category.

Below are some examples of how various counters may be used for counting, or measuring, the numbers of wireless devices of different categories of supporting carrier aggregation, when implementing the solution. In the following examples, a wireless device is called UE, a network node is called base station eNodeB or eNB, UL denotes uplink and DL denotes downlink.

In embodiments where statistics related to carrier aggregation are reported, there can be statistics for UE capability, UE configuration, UE activation and UE scheduling, as defined above. Furthermore, the statistics may be separated in downlink and uplink statistics. To exemplify, counters per number of SCell supported, configured, activated, scheduling are used separately for downlink and uplink. Alternative statistical measures and counter representation may also be considered in a similar fashion. Specific names and definitions are used in the more detailed examples described below, but the embodiments described herein are applicable to general names and definitions.

Number of CA Capable UEs on Downlink

This measurement provides the mean number of UEs capable of CA on downlink (DL), counted per the number of cells (PCell plus SCells) possible to be configured in each UE. A UE capable of one cell represents non-CA capable UE. For the definition of capable of CA, see the 3GPP document 3GPP TS 36.300, section 7.5.

A UE is considered capable of CA if it has sent an UECapabilityInformation to the eNB, see 3GPP TS 36.331, section 5.6.3.1: The UECapabilityInformation message indicated the number of DL SCells the UE is capable of, if any.

The measurement name may have the form:
  CA.DlCapable.PCellOnly, indicating the number of UEs that are not CA capable at all, i.e. only PCell capable,
  CA.DlCapable.OneSCell, indicating the number of UEs that are capable of PCell plus one SCell,
  CA.DlCapable.TwoSCells, indicating the number of UEs that are capable of PCell plus two SCells,
  CA.DlCapable.ThreeSCells, indicating the number of UEs that are capable of PCell plus three SCells,
  CA.DlCapable.FourSCells, indicating the number of UEs that are capable of PCell plus four SCells.

FIG. 8 illustrates the supporting number of SCell counter.

Number of UEs Configured for CA on DL

This measurement provides the mean number of UEs configured for CA on downlink, out of the number of CA capable UEs, counted per the number of cells (PCell and SCells) configured in each UE. Non-CA capable UEs are not counted. For the definition of configured for CA, see 3GPP TS 36.300 section 7.5.

A UE is considered configured of CA if the eNodeB has sent a RRCConnectionReconfiguration message with RRCConnectionReconfiguration-v1020-IEs where sCellToAddModList-r10 is included and the UE is successfully reconfigured; see 3GPP TS 36.331 section 6.2.2. If sCellToReleaseList-r10 is included in the RRCConnectionReconfiguration message, those cells shall be subtracted from current measurement.

The measurement name may have the form:
  CA.DlConfigured.PCellOnly, indicating the number of CA capable UEs that are not configured with any SCell,
  CA.DlConfigured.OneSCells, indicating the number of CA capable UEs that are configured with one SCeLL,
  CA.DlConfigured.TwoSCells, indicating the number of CA capable UEs that are configured with two SCells,
  CA.DlConfigured.ThreeSCells, indicating the number of CA capable UEs that are configured with three SCells,
  CA.DlConfigured.FourSCells, indicating the number of CA capable UEs that are configured with four SCells.

FIG. 8 illustrates the supporting number of SCeLL counter, but the counters representing the UEs configured for different SCells would be similar.

Number of UEs with CA Activated on DL

This measurement provides the mean number of UEs that has CA activated on downlink, counted per the number of SCells activated. For the definition of activated, see 3GPP TS 36.321, section 5.13.

A UE is considered activated for CA if the eNB has sent an Activation/Deactivation MAC Control Element message, see 3GPP TS 36.321, section 6.1.3.8.

The measurement name may have the form:
  CA.DlActivated.PCellOnly, indicating the number of CA configured UEs that have no activated SCeLL,
  CA.DlActivated.OneCell, indicating the number of CA configured UEs that have one activated SCeLL,
  CA.DlActivated.TwoSCells, indicating the number of CA configured UEs that have two activated SCells,
  CA.DlActivated.ThreeSCells, indicating the number of CA configured UEs that have three activated SCells,
  CA.DlActivated.FourSCells, indicating the number of CA configured UEs that have four activated SCells.

Again, FIG. 8 illustrates the supporting number of SCell counter, but the counters representing the UEs activated for different SCells would be similar.

Number of UEs with CA Scheduled on DL

This measurement provides the mean number of UEs that has data scheduled on downlink, counted per the number of cells simultaneously scheduled. For the definition of scheduled, see 3GPP TS 36.213, section 7.1.

A UE is considered scheduled for CA if the eNB has sent a PDCCH assignment indicating a PDSCH assignment, see 3GPP TS 36.213, section 7.1.

The measurement name can have the form:
- CA.DIScheduled.OneCell, indicating the number of CA activated UEs that have one scheduled cell,
- CA.DIScheduled.TwoCells, indicating the number of CA activated UEs that have two simultaneously scheduled cells,
- CA.DIScheduled.ThreeCells, indicating the number of CA activated UEs that have three simultaneously scheduled cells,
- CA.DIScheduled.FourCells, indicating the number of CA activated UEs that have four simultaneously scheduled cells,
- CA.DIScheduled.FiveCells, indicating the number of CA activated UEs that have five simultaneously scheduled cells.

Once more, FIG. 8 illustrates the supporting number of SCell counter, but the counters representing the UEs with one or several simultaneously scheduled cells would be similar.

Number of CA Capable UEs on Uplink

This measurement provides the mean number of UEs capable of CA on uplink (UL), counted per the number of cells (PCell plus SCells) possible to be configured in each UE. A UE capable of one cell represents non-CA capable UE. For the definition of capable of CA, see 3GPP TS 36.300 section 7.5.

A UE is considered capable of CA if it has sent an UECapabilityInformation to the eNodeB, see 3GPP TS 36.331, section 5.6.3.1: The UECapabilityInformation message indicates the number of UL SCells the UE is capable of, if any.

The measurement name may have the form:
- CA.UlCapable.PCellOnly, indicating the number of UEs that are not CA capable at all, i.e. only PCell capable,
- CA.UlCapable.OneSCell, indicating the number of UEs that are capable of PCell plus one SCell,
- CA.UlCapable.TwoSCells, indicating the number of UEs that are capable of PCell plus two SCells,
- CA.UlCapable.ThreeSCells, indicating the number of UEs that are capable of PCell plus three SCells,
- CA.UlCapable.FourSCells, indicating the number of UEs that are capable of PCell plus four SCells.

FIG. 8 illustrates an example for the supporting number of SCell counter.

Number of UEs Configured for CA on UL

This measurement provides the mean number of UEs configured for CA on uplink, out of the number of CA capable UEs, counted per the number of cells (PCell and SCells) configured in each UE. Non-CA capable UEs are not counted. For the definition of configured for CA, see 3GPP TS 36.300, section 7.5.

A UE is considered configured of CA if the eNB has sent a RRCConnectionReconfiguration message with RRCConnectionReconfiguration-v1020-IEs where sCellToAddModList-r10 is included and the UE is successfully reconfigured; see 3GPP TS 36.331, section 6.2.2. If sCellToReleaseList-r10 is included in the RRCConnectionReconfiguration message, those cells shall be subtracted from current measurement.

The measurement name may have the form:
- CA.UlConfigured.PCellOnly, indicating the number of CA capable UEs that are not configured with any SCeLL,
- CA.UlConfigured.OneSCells, indicating the number of CA capable UEs that are configured with one SCeLL,
- CA.UlConfigured.TwoSCells, indicating the number of CA capable UEs that are configured with two SCells,
- CA.UlConfigured.ThreeSCells, indicating the number of CA capable UEs that are configured with three SCells,
- CA.UlConfigured.FourSCells, indicating the number of CA capable UEs that are configured with four SCells.

Again, FIG. 8 illustrates the supporting number of SCeLL counter, but the counters representing the UEs configured for different SCells would be similar.

Number of UEs with CA Activated on UL

This measurement provides the mean number of UEs that has CA activated on uplink, counted per the number of SCells activated. For the definition of activated, see 3GPP TS 36.321 section 5.13.

A UE is considered activated for CA if the eNodeB has sent an Activation/Deactivation MAC Control Element message; see 3GPP TS 36.321, section 6.1.3.8.

The measurement name may have the form:
- CA.UlActivated.PCellOnly, indicating the number of CA configured UEs that have no activated SCell,
- CA.UlActivated.OneCell, indicating the number of CA configured UEs that have one activated SCell,
- CA.UlActivated.TwoSCells, indicating the number of CA configured UEs that have two activated SCells,
- CA.UlActivated.ThreeSCells, indicating the number of CA configured UEs that have three activated SCells,
- CA.UlActivated.FourSCells, indicating the number of CA configured UEs that have four activated SCells, The counters representing the UEs activated for different SCells would be similar to the counters illustrated in FIG. 8.

Number of UEs with CA Scheduled on UL

This measurement provides the mean number of UEs that has data scheduled on uplink, counted per the number of cells scheduled. For the definition of scheduled, see 3GPP TS 36.213, section 8.0.

A UE is considered scheduled for CA if the eNodeB has sent a PDCCH assignment and/or a PHICH indicating to the UE that a PUSCH transmission is requested; see 3GPP TS 36.213, section 8.0.

The measurement name may have the form:
- CA.UlScheduled.OneCell, indicating the number of CA activated UEs that have one scheduled cell,
- CA.UlScheduled.TwoCells, indicating the number of CA activated UEs that have two simultaneously scheduled cells,
- CA.UlScheduled.ThreeCells, indicating the number of CA activated UEs that have three simultaneously scheduled cells,
- CA.UlScheduled.FourCells, indicating the number of CA activated UEs that have four simultaneously scheduled cells,
- CA.UlScheduled.FiveCells, indicating the number of CA activated UEs that have five simultaneously scheduled cells.

Once again, FIG. 8 illustrates the supporting number of SCell counter, but the counters representing the UEs with one or several simultaneously scheduled cells would be similar.

While the solution has been described with reference to specific exemplary embodiments, the description is generally only intended to illustrate the inventive concept and should not be taken as limiting the scope of the solution. For example, the terms "network node", "O&M node", "wireless device", "radio network feature" and "statistical information" have been used throughout this description, although any other corresponding entities, functions, and/or parameters could also be used having the features and characteristics described here. The solution is defined by the appended claims.

The invention claimed is:

1. A method performed by a network node of a radio network, for supporting evaluation of usage of a radio network feature in radio communication between wireless devices and the network node, the method comprising:
retrieving statistical information regarding the usage of the radio network feature, and
reporting the statistical information to an Operation and Maintenance (O&M) node serving the radio network, thereby enabling the O&M node to use the statistical information for evaluating how measured performance of the radio network is related to the usage of the radio network feature.

2. The method of claim 1, wherein the statistical information indicates at least one of:
a number of wireless devices that are capable of using the radio network feature,
a number of wireless devices that are configured to use the radio network feature,
a number of wireless devices that are activated to use the radio network feature, and
a number of wireless devices that are scheduled to use the radio network feature.

3. The method of claim 2, further comprising aggregating the statistical information by means of wireless device counters comprising at least one of: a counter of all wireless devices, a counter of wireless devices capable of using the radio network feature, a counter of wireless devices configured to use the radio network feature, a counter of wireless devices activated to use the radio network feature, and a counter of wireless devices scheduled to use the radio network feature.

4. The method of claim 2, further comprising aggregating separately the statistical information for uplink communication and downlink communication.

5. The method of claim 1, wherein the radio network feature pertains to carrier aggregation comprising usage of two or more carriers.

6. The method of claim 5, further comprising aggregating the statistical information by using a wireless device counter for each aspect of device capability related to number of supported carriers.

7. The method of claim 1, wherein the radio network feature pertains to Multiple Input Multiple Output (MIMO) operation that comprises usage of two or more data streams.

8. The method of claim 7, further comprising aggregating the statistical information by using a wireless device counter for each aspect of device capability related to number of supported data streams.

9. The method of claim 1, wherein the statistical information is retrieved from a scheduling entity associated with the network node.

10. The method of claim 1, further comprising aggregating the statistical information by determining at least one of: a mean value, a median value, a maximum value, a minimum value, one or more percentiles, and a standard deviation, of the number of wireless devices involved in usage of the radio network feature over a time period.

11. The method of claim 1, wherein the network node is a base station.

12. A network node of a radio network, the network node being arranged to support evaluation of usage of a radio network feature in radio communication between wireless devices and the network node, the network node comprising:
a processing unit configured to retrieve statistical information regarding the usage of the radio network feature; and
a communication circuitry configured to report the statistical information to an Operation and Maintenance (O&M) node serving the radio network, thereby enabling the O&M node to use the statistical information for evaluating how measured performance of the radio network is related to the usage of the radio network feature.

13. The network node of claim 12, wherein the statistical information indicates at least one of:
a number of wireless devices that are capable of using the radio network feature,
a number of wireless devices that are configured to use the radio network feature,
a number of wireless devices that are activated to use the radio network feature, and
a number of wireless devices that are scheduled to use the radio network feature.

14. The network node of claim 13, wherein the processing unit is configured to aggregate the statistical information by means of wireless device counters comprising at least one of: a counter of all wireless devices, a counter of wireless devices capable of using the radio network feature, a counter of wireless devices configured to use the radio network feature, a counter of wireless devices activated to use the radio network feature, and a counter of wireless devices scheduled to use the radio network feature.

15. The network node of claim 13, wherein the processing unit is configured to aggregate separately the statistical information for uplink communication and downlink communication.

16. The network node of claim 12, wherein the radio network feature pertains to carrier aggregation comprising usage of two or more carriers.

17. The network node of claim 16, wherein the processing unit is configured to aggregate the statistical information by using a wireless device counter for each aspect of device capability related to number of supported carriers.

18. The network node of claim 12, wherein the radio network feature pertains to Multiple Input Multiple Output (MIMO) operation comprising usage of two or more data streams.

19. The network node of claim 18, wherein the processing unit is configured to aggregate the statistical information by using a wireless device counter for each aspect of device capability related to number of supported data streams.

20. The network node of claim 12, wherein the processing unit is configured to retrieve the statistical information from a scheduling entity associated with the network node.

21. The network node of claim 12, wherein the processing unit is configured to aggregate the statistical information by determining at least one of: a mean value, a median value, a maximum value, a minimum value, one or more percentiles, and a standard deviation, of the number of wireless devices involved in usage of the radio network feature over a time period.

22. The network node of claim 12, wherein the network node is a base station.

23. A method, performed by an Operation and Maintenance (O&M) node serving a radio network, for evaluating usage of a radio network feature in radio communication between wireless devices and a network node of the radio network, the method comprising:
- obtaining measurements of radio network performance;
- receiving statistical information regarding the usage of the radio network feature from the network node;
- using the statistical information for performing evaluation of how the radio network performance is related to the usage of the radio network feature; and
- employing the radio network feature based on said evaluation.

\* \* \* \* \*

UNITED STATES PATENT AND TRADEMARK OFFICE
CERTIFICATE OF CORRECTION

PATENT NO. : 9,894,543 B2
APPLICATION NO. : 14/115644
DATED : February 13, 2018
INVENTOR(S) : Elmdahl et al.

It is certified that error appears in the above-identified patent and that said Letters Patent is hereby corrected as shown below:

On the Title Page

On Page 2, Item (56), under "OTHER PUBLICATIONS", in Column 2, Line 36, delete "Fukoka," and insert -- Fukuoka, --, therefor.

In the Specification

In Column 7, Line 42, delete "more SCell" and insert -- more SCells --, therefor.

In Column 10, Line 32, delete "network node 600" and insert -- network node 500 --, therefor.

In Column 14, Line 35, delete "SCeLL," and insert -- SCell, --, therefor.

In Column 14, Line 43, delete "SCeLL" and insert -- SCell --, therefor.

In Column 14, Line 56, delete "SCeLL," and insert -- SCell, --, therefor.

In Column 14, Line 58, delete "SCeLL," and insert -- SCell, --, therefor.

In Column 14, Line 64, delete "SCells," and insert -- SCells. --, therefor.

In Column 16, Line 4, delete "SCeLL," and insert -- SCell, --, therefor.

In Column 16, Line 6, delete "SCeLL," and insert -- SCell, --, therefor.

In Column 16, Line 13, delete "SCeLL," and insert -- SCell, --, therefor.

In Column 16, Line 34, delete "SCells," and insert -- SCells. --, therefor.

Signed and Sealed this
Twenty-second Day of September, 2020

Andrei Iancu
*Director of the United States Patent and Trademark Office*